US009568161B2

(12) United States Patent

Hansmann et al.

(10) Patent No.: US 9,568,161 B2

(45) Date of Patent: Feb. 14, 2017

(54) VENTILATION SYSTEM FOR VEHICLE LIGHTING

(71) Applicants: Hella KGaA Hueck & Co., Lippstadt (DE); AZ Ausruestung und Zubehoer GmbH & Co. KG, Hattingen (DE)

(72) Inventors: Frank Hansmann, Lippstadt (DE); Jens Oliver Meyer, Wuelfrath (DE); Michael Wysok, Hattingen (DE)

(73) Assignees: Hella KGaA Hueck & Co., Lippstadt (DE); AZ Ausruestung und Zubehoer GmbH & Co. KG, Hattingen (DE)

( * ) Notice: Subject to any disclaimer, the term of this patent is extended or adjusted under 35 U.S.C. 154(b) by 0 days.

(21) Appl. No.: 14/707,506

(22) Filed: May 8, 2015

(65) Prior Publication Data

US 2015/0323151 A1 Nov. 12, 2015

(30) Foreign Application Priority Data

May 8, 2014 (DE) ........................ 10 2014 106 501

(51) Int. Cl.

| | |
|---|---|
| ***B60Q 1/00*** | (2006.01) |
| ***F21S 8/10*** | (2006.01) |
| *F21V 29/00* | (2015.01) |
| *F21V 31/03* | (2006.01) |

(52) U.S. Cl.

CPC .............. *F21S 48/332* (2013.01); *F21S 48/32* (2013.01); *F21S 48/325* (2013.01); *F21S 48/328* (2013.01); *F21S 48/335* (2013.01); *F21S 48/337* (2013.01); *F21V 29/002* (2013.01); *F21V 29/004* (2013.01); *F21V 31/03* (2013.01)

(58) Field of Classification Search

CPC ........ F21S 48/332; F21S 48/32; F21S 48/325; F21S 48/335; F21S 48/337; F21S 48/328; F21V 29/002; F21V 29/004; F21V 31/03

See application file for complete search history.

(56) References Cited

U.S. PATENT DOCUMENTS

| | | | | |
|---|---|---|---|---|
| 2009/0109618 A1* | 4/2009 | Yano ...................... | H05K 5/068 361/694 |
| 2014/0137739 A1* | 5/2014 | Ishii et al. ........... | H05K 5/0213 96/11 |
| 2014/0290489 A1* | 10/2014 | Uemura et al. ......... | F24F 13/28 96/4 |

FOREIGN PATENT DOCUMENTS

| | | |
|---|---|---|
| EP | 1997685 B1 | 4/2010 |
| EP | 1363069 B1 | 2/2011 |

* cited by examiner

*Primary Examiner* — Y M Lee

(74) *Attorney, Agent, or Firm* — Patent Central LLC; Stephan A. Pendorf

(57) ABSTRACT

A ventilation system for a vehicle headlight housing. The ventilation body has an inner part extending into the housing opening as well as an outer part extending circumferentially about the opening wall of the housing opening, which on the one hand offers, in the locked position thereof, a sealing attachment and on the other hand provides a labyrinthic ventilation channel.

10 Claims, 5 Drawing Sheets

VENTILATION SYSTEM FOR VEHICLE LIGHTING

BACKGROUND OF THE INVENTION

Field of the Invention

The invention relates to a ventilation system for vehicle lighting having a housing including:

a housing opening with an outwardly projecting opening wall, a ventilation body, which is fixed to the housing opening and which includes a ventilation element, a membrane and a cap covering the end of the ventilation body opposite the housing opening, wherein a ventilation channel with a plurality of baffles or diversions is formed between an edge of the ventilation element and the housing opening Description of the Related Art From EP 1363069 B1 a ventilation system is known comprising a housing, to the rear side of which a ventilation system is fitted. The ventilation system comprises a ventilation body which is connected by latching to a housing opening of the lighting device. The ventilation body has for this purpose a plurality of latching fingers which engage behind the housing opening with barb-like grip. In a central region the ventilation body has axial openings, so that air exchange between the interior of the housing and the environment is ensured. A breathable membrane is provided on the outside of the ventilation body. The protection of the housing against penetration of dust is limited, since no labyrinth-like ventilation channel is provided.

EP 1997685 B1 discloses a ventilation system with a labyrinth-like ventilation channel. This is formed from a three-part ventilation body having an existing ventilation element made from an elastomer material, a membrane and a cap. The elastomeric ventilation element is designed as a hollow cylinder and has radial openings, which are closed by the membrane. The ventilation element is slipped over an open end face with a closed circumferentially and outwardly projecting opening wall of a housing opening and is, in the locked position, almost completely surrounded by the cap. Both a front-side edge of the ventilation element and an edge of the cap are arranged at a distance from an adjoining opening wall of the housing, so that air can flow in an annular aeration channel formed between the axial wall of the cap and a circumferential wall of the ventilation element. A first diversion of the ventilation channel is formed in the region of the axially extending membrane, wherein an air flow is diverted from the axial direction into the radial direction. Within the ventilation element there is a further diversion in the region of an outer edge of the housing opening, wherein the air flow is deflected from the radial direction in the axial direction in passing through the housing opening. A disadvantage of the known ventilation system is that it provides a relatively poor tactile feedback when reaching the end position for the attachment of the ventilation element, so that assembly errors are difficult to recognize.

The object of the present invention is therefore to improve a ventilation system such that a simple mounting and a reliable fixing is made possible, whereby a high degree of sealing and a variable application is guaranteed.

BRIEF SUMMARY OF THE INVENTION

To achieve the object, the invention in connection with the preamble of claim 1 is characterized in that the ventilation body at the end remote from the housing opening comprises a receiving opening for receiving the membrane, wherein the membrane is oriented perpendicular to an axial direction of the housing opening and the ventilation element, the ventilation element has an outer part, which provides a radial projection, the edge of which is arranged spaced to the housing opening to form a first diversion of the ventilation channel, the ventilation element includes an inner part projecting into the housing opening, with a radial opening arranged in a region between the membrane and the cap, and facing the radial projection, to form a second diversion of the ventilation channel, as well as an axial opening freeing an axial segment of the ventilation channel, the ventilation element and the housing opening are configured such that the ventilation element can be brought from an unlocked into a locked position or vice versa by rotation by a predetermined angle of rotation relative to the housing opening.

According to the invention, a ventilation body is provided, in which a membrane is integrated oriented perpendicular to an axial direction of the housing opening. The ventilation body has an inner part extending into the housing opening as well as an outer part extending circumferentially about the opening wall of the housing opening, which on the one hand offers, in the locked position thereof, a sealing attachment and on the other hand provides a labyrinthic ventilation channel. By a radial projection from the outer part on one side of the ventilation body an end of the ventilation channel is defined. By the forming the outer and inner part a multiple diversion occurs, so that the other end of the ventilation channel borders an axial ventilation section. The ventilation element, preferably integrally formed, enables, besides the sealing engagement with the housing opening, also a simple and variable fixing characterized in that it forms a rotary engagement with the housing opening. It is fixed by means of a relative rotation of the ventilation element or the ventilation body to the housing opening by a predetermined angle of rotation between a first rotational position in which the ventilation body is in an unlocked position and a second rotational position in which the ventilation body is in a locked position. The detent means of such rotary closure in particular enables a coding of different ventilation bodies, which ensures a secure fixing of intended ventilation bodies at the same housing opening. In this way, incorrect assembly of different ventilation systems can be securely prevented. The ventilation system of the present invention not only serves to ventilate the enclosure, but also for equalization of pressure between the housing and the environment. The ventilation system according to the invention is preferably used for vehicle lighting, especially headlights, on the one hand for ventilation of the headlight housing and on the other hand to ensure protection against ingress of moisture. Alternatively, the ventilation system according to the invention can also be used for ventilation and/or for pressure equalization of other enclosures, for example. control modules, batteries and the like.

According to a preferred embodiment of the invention, the ventilation body and the housing opening have locking elements, allowing the ventilation body to be held on the housing opening in form-locking position and/or held positively/force fitting. For example, the locking elements can be formed so that the ventilation body is held by means of a bayonet fixture to the housing opening in the locking position of the locking elements.

According to a preferred embodiment of the invention, the inner part of the ventilation element has at a free end a side fastening tab, which in the locked position engages behind a bottom arc section of the housing opening in a latching manner. This allows an axial holding force to be exerted, which leaves the ventilation body in a sealing and secure engaged position in the locking position.

According to another embodiment, the free end of the inner part of the ventilation element and an edge of the housing opening are designed to work together so that from a plurality of different types of ventilation bodies only a predetermined type of ventilation body can be rotated into the locking position. The inner part of the ventilation element and/or the edge of the housing opening thus have a coding which allows the locking of only a type of ventilation bodies. As a result, incorrect assembly of the "wrong" ventilation bodies in the same housing opening is avoided. The coding is based on the shape of the inner part and/or the housing opening, so that a coding based on a label is not required.

According to a further development of the invention, the inner part of the ventilation element is provided a cylindrical circumferential radial surface, which sealingly bears in the locking position on an inner side of the cylindrical opening wall. In this way, a circumferentially sealing system of rigid parts of the ventilation element and the housing opening is provided in the locking position.

According to a further development of the invention, the housing opening has an annular protruding ring located at a radial distance from the opening wall, extending in the axial direction, which serves as a stop for the stop elements arranged on the outer part of the ventilation element, so that except for the region of the radial projection, the outer part of the ventilation element is in sealing contact with the ring of the housing opening. In this way, a sealing engagement is provided to the housing opening by means of the outer part, the end of the ventilation channel being provided in the region of the radial projection. The outer part is preferably flexible, so that a tolerance compensation can be made to the relatively rigid material of the housing opening. Advantageously, it thereby saves an otherwise necessary sealing. While the housing consists of a relatively rigid material, at least the outer part is made of a relatively flexible material.

According to a further development of the invention, the radial opening of the inner part of the ventilation element and the radial projection of the outer part of the ventilation element are arranged on the same side so that a defined first and second diversion of the air ventilation passageway is provided on the same side of the ventilation body or in an axial plane thereof. The invention enables a labyrinth-like design of the ventilation channel, so that the membrane is protected against mechanical or chemical damage induced by aggressive media.

According to a further development of the invention, the housing opening includes a mounting frame arranged at a radial distance from the opening wall and the ring and projecting axially and having an arcuate portion and a lateral bulge or recess, said bulge or recess being adapted to the radial projection of the ventilation element, so that the ventilation body can be rotated only within an acute angle of rotation range in which the radial projection is in the bulge and/or is located in the recess. Due to the bulge in a simple way, the recognition or mounting position of the ventilation body at the housing opening in the unlocked position is defined, thus simplifying assembly. In addition, the mounting frame provides a splash guard of the ventilation system in the locked position. For example, the mounting frame can be formed in the manner of a keyhole.

The housing opening 1 includes a mounting frame 28, which extends keyhole-shaped around the opening wall 10 or ring 14. The mounting frame 28 is formed protruding out of the plane of the housing wall 9 and serves as a splash guard. It has a bulge 29 in a region which has a larger radius than the other arcuate portion 30 of the mounting frame 28, so that the ventilation element 3 with its radial projection 18 can be attached to the housing opening 1 in a specific rotational position. The bulge 29 has a radial distance from the axis A, which is greater than a radial distance of the radial projection 18. The arcuate portion 30 of the mounting frame 28 has a radius which is smaller than the radius of the radial projection 18. In this manner it is ensured that the above defined type of ventilation body 2 can always be seated or located in a defined non-locked position to the housing opening 1.

Other advantages of the invention will become apparent from the other dependent claims.

BRIEF DESCRIPTION OF THE SEVERAL VIEWS OF THE DRAWINGS

An embodiment of the invention is explained in more detail with reference to the drawings.

In the drawings.

DETAILED DESCRIPTION OF THE INVENTION

Figure 1:
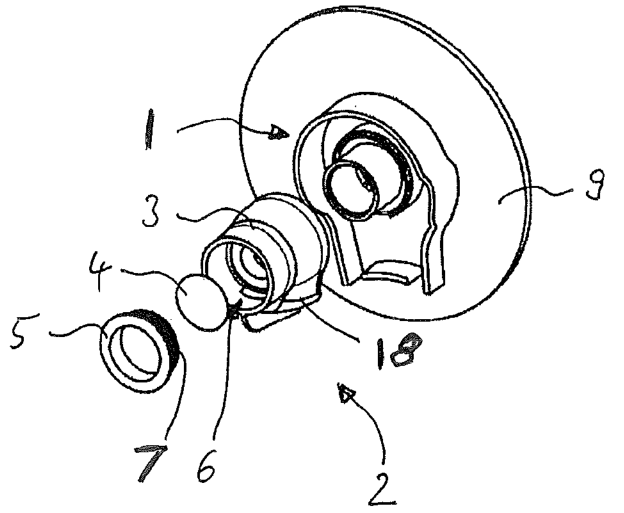
FIG. 1 is an exploded view of a ventilation system with a housing opening and a ventilation body, consisting of a ventilation element, a membrane and a cap.

A ventilation system can be used for example for vehicle lighting. Alternatively, the ventilation system can be used for the ventilation and/or pressure equalization of other enclosures, such as control units, batteries.

A lighting device for a vehicle can be arranged in the front or rear region of the vehicle. The lighting device comprises a housing in which at least one light source and a therewith associated lens or optics unit is arranged for producing a light beam. By means of the light beam, a predetermined light distribution, such as a low beam or high beam distribution, can be produced. The housing, which is comprised of a rigid material, has an opening on the front in the main illumination direction, which is covered by a translucent lens. At a rear side of the housing, preferably on a vertical wall of the housing (housing wall 9), an aeration system for mutual exchange of air between an interior of the housing and the environment is provided. The ventilation system is formed on the one hand by molding or formation of a housing opening 1 and on the other hand by forming a ventilation body 2 attachable to the housing opening 1.

The ventilation body 2 is formed in the present embodiment in three parts and has a ventilation element 3, a breathable membrane 4, and a preferably plate-shaped cap 5.

The ventilation element 3 has, on the side opposite from the housing 1, a receiving opening 6, in which the membrane 4 is mounted. The cap 5, provided with barb-shaped annular elements 7, engages in the receiving opening 6 of the ventilation element 3 and covers the membrane 4 towards the outside.

The ventilation element 3 can be made from the same plastic material as the housing or the housing opening 1. Alternatively, the ventilation element 3 may be made of a different material than the housing or the housing opening 1. The ventilation element 3 has an inner part 8, which penetrates into a cylindrical opening wall 10 projecting outwardly from the housing 9 of the housing opening 1. As is apparent from FIGS. 4 and 5, the inner part 8 of the ventilation element 3 extends into the housing up to a plane of the housing 9.

Further, the ventilation element 3 comprises an outer part 11 which is integrally connected to the inner part 8 and extends substantially outside the opening wall 10 of the housing opening 1.

The outer part 11 has a circumferentially closed wall 12 widening in the direction of an open side, whose free edge 13, in a locking position of the ventilation body 2, bears sealingly on a ring 14 of the housing opening 1. The ring 14 of the housing opening 1 is arranged at an axial distance from the opening wall 10 of the same; consequently, the ring 14 has a larger radius than the opening wall 10. The ring 14 has a considerably smaller axial extension in comparison with the opening wall 10. The ring 14 serves as a stop for the stop members 15 formed integrally on the inside of the wall 12 of the outer part 11, so that the edge 13 of the outer part 11 can sealingly abut against the outside of the ring 14. This sealing contact of the edge 13 of the outer part 11 on the ring 14 extends at an obtuse angle to an axis A of the housing opening 1.

Figure 4:
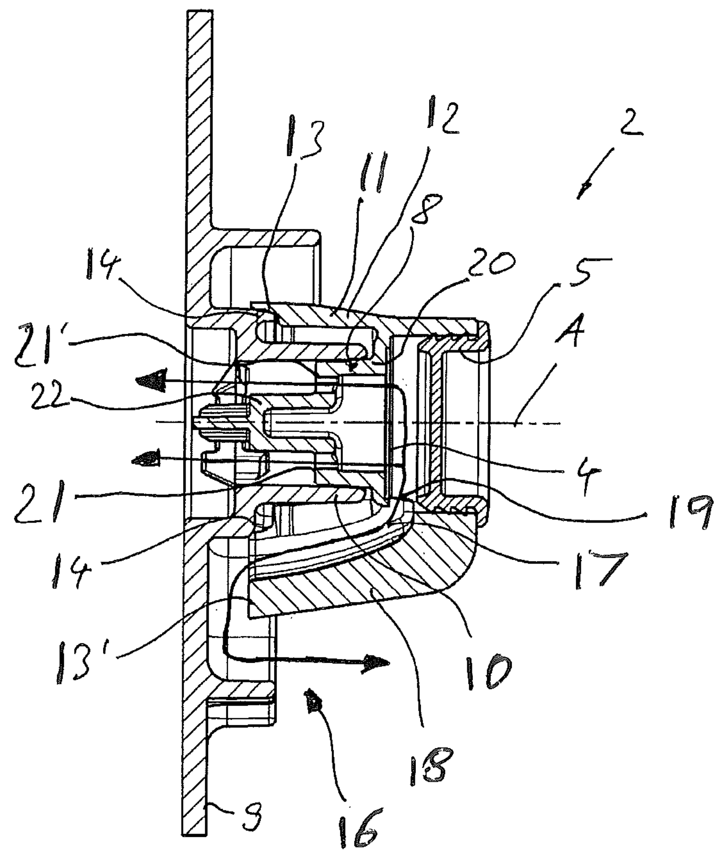
FIG. 4 is a vertical section along the section line IV-IV in FIG. 3.
Figure 5:
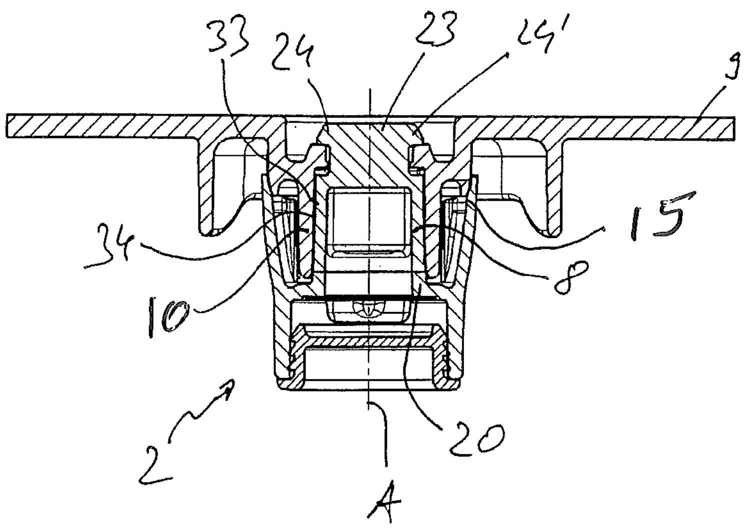
FIG. 5 is a horizontal section along the section line VV in FIG. 3.
Figure 6:
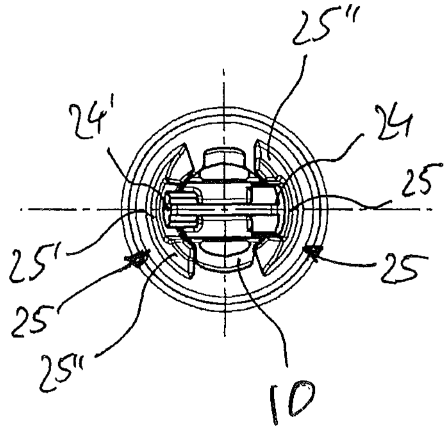
FIG. 6 is a rear view of the ventilation system in the locked position seen from the interior of the housing.
Figure 7:
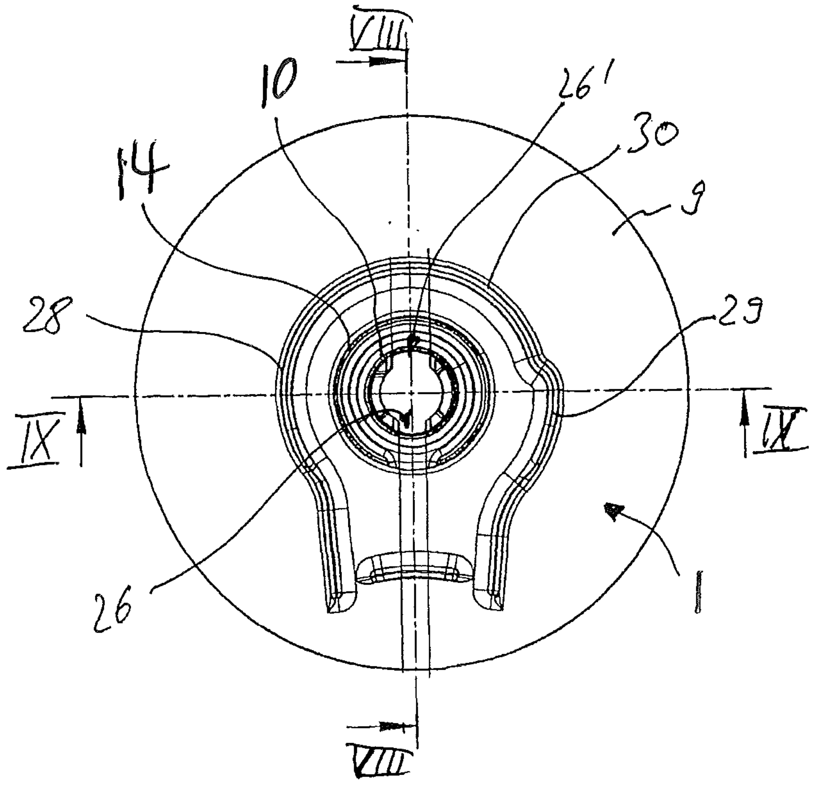
FIG. 7 is a front view of the housing opening.
Figure 8:
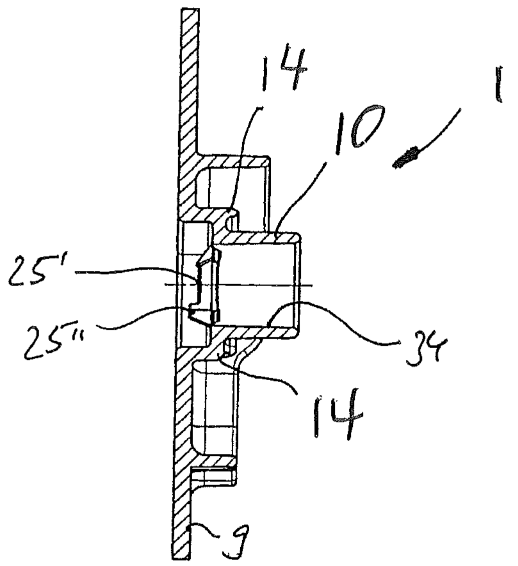
FIG. 8 is a vertical section through the housing opening along the section line VIII-VIII in FIG. 7.
Figure 9:
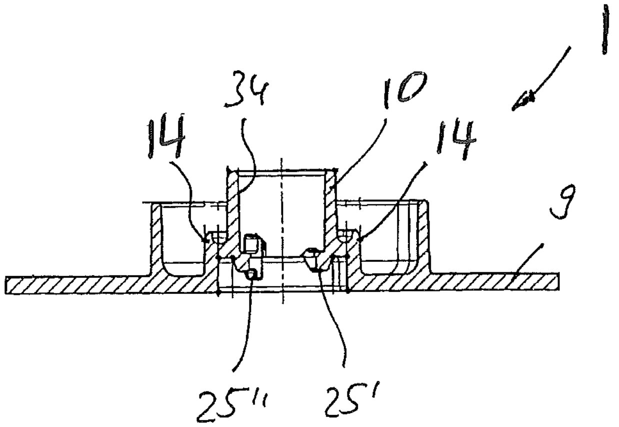
FIG. 9 is a horizontal section through the housing opening along the section line IX-IX in FIG. 7.

To form a first end 16 of a ventilation channel 17 shown by arrows in FIG. 4, the outer part 11 has a radial projection 18, which incorporates a portion of the wall 12, which is arranged at a radial distance to the ring 14 of the housing opening 1. As can be seen in particular from FIG. 4, in the locking position of the ventilation body 2, an air passage is thereby formed between a part 13' of the edge 13 of the outer member 11 and the housing 9. At this passage, a first diversion (deflection, baffle, bend) 41 of the ventilation channel 17 occurs.

A second diversion 42 of the ventilation channel 17 is formed by a radial opening 19 of the inner part 8 that connects the air passage between an axial portion 17' of the ventilation channel 17 within the opening wall 10 and an axial portion outside the opening wall 10. So that an air exchange is ensured within the opening wall 10, the inner part 8 has, at a foot portion 20, two axial openings 21, which are arranged on both sides of a central extension portion 22 of the inner part 8.

The ventilation body 2 is formed as a rotary member, which is bayonet-like rotary locked with the housing opening 1. For this purpose, the extension part 22 of the interior part 8 is provided at one end 23 with barb-shaped locking elements 24, 24', which cooperate with locking elements 25 of the housing opening 1 in such a manner, that by relative rotation of the ventilation body 2 in the direction of rotation D relative to the housing opening 1 the ventilation body 2 can be brought from a non-locked position in a first rotational position according to FIG. 2 into a locking position according to FIG. 3. To this end, oppositely lying locking elements 24, 24' of the extension part 22 are arranged opposite and protrude radially from the extension part 22.

The locking elements 25 of the housing opening 1 extend partially circular on a side of the housing wall 9 opposite the ventilation body 2 on an edge of the opening wall 10, wherein the locking elements 25 each have an arc portion 25' of constant height protruding in the axial direction and at its end a locking portion 25" with an elevated height as compared to the curved section 25'. The blocking portion 25" acts as a stop for the locking element 24, 24' of the inner part 8 and thus defines the locking position of the ventilation body 2. The height of the arc section 25' is dimensioned such that the ventilation body 2 clamped or is held axially. The arcuate portions 25' of oppositely disposed locking elements 25 extend at an acute angle region around the axis A.

The radius of the locking elements 25 substantially corresponds to the radius of the locking elements 24. In the circumferential direction adjacent to the locking elements 25, the housing opening 1 has on a radial portion 26 a radius, which is equal to or slightly larger than the radius of the locking elements 24 of the inner part 8. In this manner, the end of the inner part 8 with the locking elements 24, in the locking position, can engage behind or is insertable through the housing opening 1.

Preferably, the edge portion 26 of the housing opening 1, of which the radius is equal to or greater than the radius of the locking elements 24, may be matched to the shape of the locking elements 24, such that only a predetermined type of ventilation body 2 is insertable in the non-locked position and then rotated into the locking position. In the present embodiment, the housing opening 1 has a narrow edge portion 26 and a long edge portion 26' at opposite sides, which correspond to a narrow locking element 24 or a wide locking element 24'. In this way, the ventilation body can be attached to the housing opening 1 only in a specific rotation position. An insertion in a 180° skewed arrangement would not be possible. In this manner, it is possible to prevent, for example, that a ventilation body can be locked to the housing opening 1 without integrated membrane 4. As a result, an encoding of the ventilation system is ensured.

Figure 2:
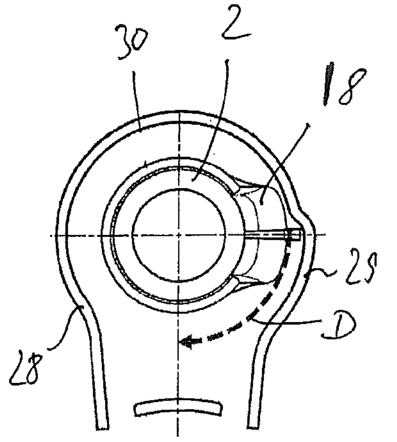
FIG. 2 is a front view of the ventilation system in an unlocked position of the ventilation body.

As can be seen from FIG. 2, the ventilation body 2 is set to the housing opening 1 in a first rotational position, wherein the locking elements 24, 24' of the inner part 8 engage so far into the housing opening 1 that they are located behind the edge portion 26, 26', so already inside the housing.

The housing opening 1 includes a mounting frame 28, which extends keyhole-shaped around the opening wall 10 or ring 14. The mounting frame 28 is formed protruding out of the plane of the housing wall 9 and serves as a splash guard. It has a bulge 29 in a region which has a larger radius than the other arcuate portion 30 of the mounting frame 28, so that the ventilation element 3 with its radial projection 18 can be attached to the housing opening 1 in a specific rotational position. The bulge 29 has a radial distance from the axis A, which is greater than a radial distance of the radial projection 18. The arcuate portion 30 of the mounting frame 28 has a radius which is smaller than the radius of the radial projection 18. In this manner it is ensured that the above defined type of ventilation body 2 can always be seated or located in a defined non-locked position to the housing opening 1.

According to an alternative embodiment not shown, a recess may be provided instead of a protrusion. However, this reduces the splash effect.

Figure 3:
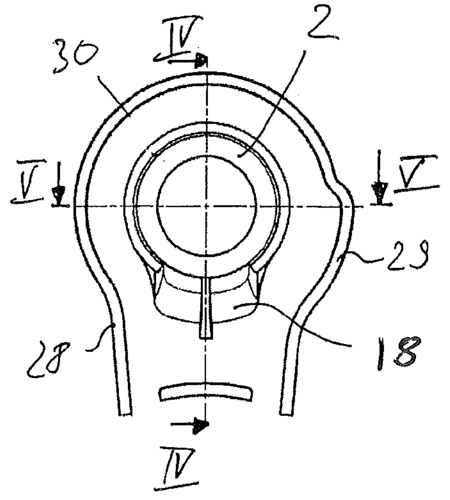
FIG. 3 is a front view of the ventilation system in a locked position of the ventilation body.

After the ventilation body 2 has been brought into the non-locked position according to FIG. 2, this can be brought into the locking position according to FIG. 3 by a 90° rotation of the ventilation body 2 about the axis A which serves as the axis of rotation. In this locking position the locking elements 24, 24' engage behind the arcuate portions 25' of the edge of the housing opening 1. The ventilation body 2 is positively (form-fitting) and/or non-positively held on the housing opening 1.

In the locking position a seal forms between the ventilation body 2 and the housing opening 1 in a groove extending in a reflex angle area by abutment of the edge 13 of the outer part 11 on the ring 14 of the housing opening 1. On the other hand, a further seal is formed, namely a 360°-seal, by a cylindrical radial surface 33 of the inner part 8 lying against an inner side 34 of the opening wall 10. Preferably, the radial surface 33 has, in a membrane 4 facing end region, a shoulder, so that only one a membrane 4 facing end portion of the foot portion 20 of the inner part 8 lies against the opening wall 10 and ensures a radial seal. The seal thus extends only in an axial partial region of the foot part 20 of the inner part 8.

Figure 10:
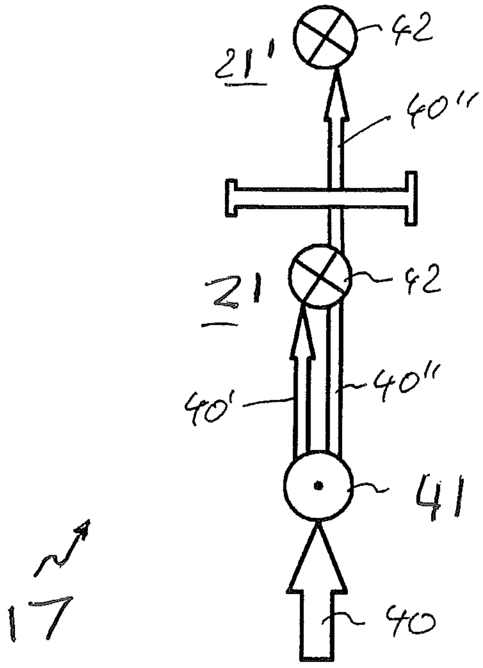
FIG. 10 is seen a schematic representation of the flow in the direction of the housing through the ventilation channel formed by the ventilation system.

In the locking position, the ventilation channel 17 is formed, which has the two diversions. As shown schematically in FIG. 10, under the assumption that air is to flow from the outside 40 into the housing, the first diversion 41 is carried on the radial projection 18 of the outer part 11. From the breakthrough formed between the radial projection 18 and the wall 12 of the housing opening 1, the air 40 flows between the wall of the outer part 11 and the opening wall 10 substantially in an axial direction away from the housing wall 9 of the housing opening 1, until it reaches the radial opening 19 of the inner part 8. There, the second diversion 42 occurs radially offset, wherein a first branch of flow 40' flows through the axial opening 21 arranged below the extension part 22 and a second branch of flow 40" flows in the vertical direction above the extension part 22 in the direction of the axial opening 21' in the direction of plane of extension of the wall 9.

To unlock, the ventilation body 2 is rotated (counterclockwise) by 90° from the locking position according to FIG. 3, opposite to the rotation direction D, until the locking elements 24, 24' are in height of the edge portions 26, 26', so that the ventilation body 2 can be removed in the axial direction from the housing opening 1.

The ventilation body 2 serves on the one hand for the ventilation of the enclosure and on the other hand for pressure equalization between the housing and the environment. Preferably, the housing is made of a rigid material, while the ventilation body 2, or in particular the ventilation element 3, is made of such a flexible material, that at least the outer part 11 can be flexibly assembled or mounted at the housing opening 1. Due to the flexibility of the outer portion 11, a tolerance compensation in the axial direction can be made at the housing opening or to the housing.

The wall of the outer part 11 forms a flexible sealing face, which rests sealingly on an outer side of the ring 14 of the housing opening 1, so that the wall is frictionally connected in the radial direction with the outer side of the ring 14. In this way on the one hand a sealing function and on the other hand a fastening function is achieved, whereby the fastening function prevents that the ventilation body 2 can be detached from the housing under vibration during operation of the ventilation system.

The invention allows a simple visual recognition of the incorrect assembly of the aeration body 2 to the housing. In the case of incorrect assembly, there is either a radial offset and/or an axial misalignment. Advantageously, this results in an additional automatic query option, or incorrect assembly inspection, during assembly.

The invention claimed is:

1. A ventilation system for vehicle lighting with a housing comprising:

a housing opening with an outwardly projecting wall, a ventilation body which is fixed to the housing opening and has a ventilation element, a membrane, and a cap covering an end of the ventilation body opposite the housing opening, wherein a ventilation channel with a plurality of baffles or diversions is formed between an edge of the ventilation element and the housing opening, wherein the ventilation body (2) has, on the end opposite the housing opening (1), a receiving opening (6) for receiving the membrane (4), said membrane (4) running perpendicular to an axial direction of the housing opening (1) and the ventilation element (3), the ventilation element (3) comprises an outer part (11), from which a radial projection (18) protrudes, whose edge (13') is spaced from the housing opening (1) and is arranged to form a first diversion (41) of the ventilation channel (17), the ventilation element (3) includes an inner part (8) projecting into the housing opening (1), with a radial opening (19) arranged in a region between the membrane (4) and the cap (5), and facing the radial projection (18), to form a second diversion (42) of the ventilation channel (17), as well as an axial opening (21, 21') freeing an axial segment of the ventilation channel (17), and the ventilation element (3) and the housing opening (1) are configured such that the ventilation element (3) can be brought from an unlocked into a locked position or vice versa by rotation by a predetermined angle of rotation relative to the housing opening (1).

2. The ventilation system according to claim 1, wherein the ventilation body (2) and the housing opening (1) have locking elements (24, 24' 25, 25', 25") such that, by rotation of the ventilation body (2) relative to the housing opening (1) about an axis of rotation (A) extending in an axial direction of the housing opening (1) the ventilation body (2) is not locked in a first rotational position and locked in a second rotational position.

3. The ventilation system according to claim 1, wherein the locking elements (25, 25', 25", 24, 24') of the housing opening (1) and the ventilation body (2) are formed such that the ventilation body (2) in the locked position is held positively and/or force-fitting on the housing opening (1).

4. The ventilation system according to claim 1, wherein the inner part (8) of the ventilation element (3) has at a free end a radially projecting locking element (24, 24'), which in the locking position engages behind a bottom arc portion (25') of locking element (25) of the housing opening (1) in a latching manner.

5. The ventilation system according to claim 1, wherein a free end of the inner part (8) and a rim (26, 26') of the housing opening (1) are designed to be coordinated with each other in such a way that only a predetermined type of ventilation bodies (2) among a plurality of different types of ventilation body can be introduced in the unlocked position and/or rotatable into the locked position.

6. The ventilation system according to claim 1, wherein the inner part (8) has a circumferential cylindrical radial surface (33), against which an inner side (34) of a cylindrical opening wall (10) bears sealingly.

7. The ventilation system according to claim 1, wherein the housing opening (1) has a ring (14) arranged a radial distance from the closed opening wall (10), which serves as a stop for the stop elements of the ventilation element (3), so that, with the exception of the region of the radial projection (18), the outer part (11) of the ventilation element (3) bears sealingly against a front edge (13) of the ring (14).

8. The ventilation system according to claim 1, wherein the radial opening (19) of the inner part (8) and the radial projection (18) of the outer part (11) are arranged on the same side of the ventilation element (3).

9. The ventilation system according to claim 1, wherein the housing opening (1) comprises a projecting mounting frame (28) having a part-circular portion (30) and at least one of a bulge (29) and a recess, wherein the at least one of the bulge (29) and the recess are formed so that the ventilation element (3), following axial abutment with the housing opening (1), can be brought from the unlocked position into the locking position by rotation at an acute angle.

10. The ventilation system according to claim 9, wherein the radial projection (18) and the bulge (29) have a larger radius than the part-circular portion (30) of the mounting frame (28).

* * * * *